Jan. 12, 1926.  
O. J. LEINS  
FLASH IGNITER  
Filed Nov. 24, 1924

1,569,288

Witnesses:  
W. P. Kilroy  
Harry R. LeSuite

Inventor:  
Oscar J. Leins

Patented Jan. 12, 1926.

1,569,288

UNITED STATES PATENT OFFICE.

OSCAR J. LEINS, OF MILWAUKEE, WISCONSIN, ASSIGNOR TO MILWAUKEE GAS SPECIALTY CO., OF MILWAUKEE, WISCONSIN, A CORPORATION OF WISCONSIN.

FLASH IGNITER.

Application filed November 24, 1924. Serial No. 751,799.

*To all whom it may concern:*

Be it known that I, OSCAR J. LEINS, a citizen of the United States, residing at Milwaukee, in the county of Milwaukee and State of Wisconsin, have invented a certain new and useful Improvement in Flash Igniters, of which the following is a full, clear, concise, and exact description, reference being had to the accompanying drawings, forming a part of this specification.

This invention relates to flash igniters and its object is the provision of an improved structural combination for producing the flash or igniting flame and for shutting off or adjusting the pilot and flash flames.

The invention is illustrated in the accompanying drawings, in which.

Figure 1:
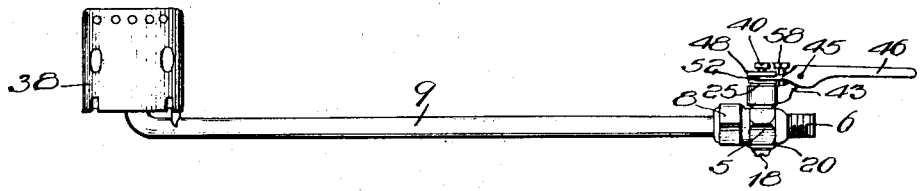
Figure 1 is a side elevational view of an igniter or lighter embodying the invention.
Figure 2:
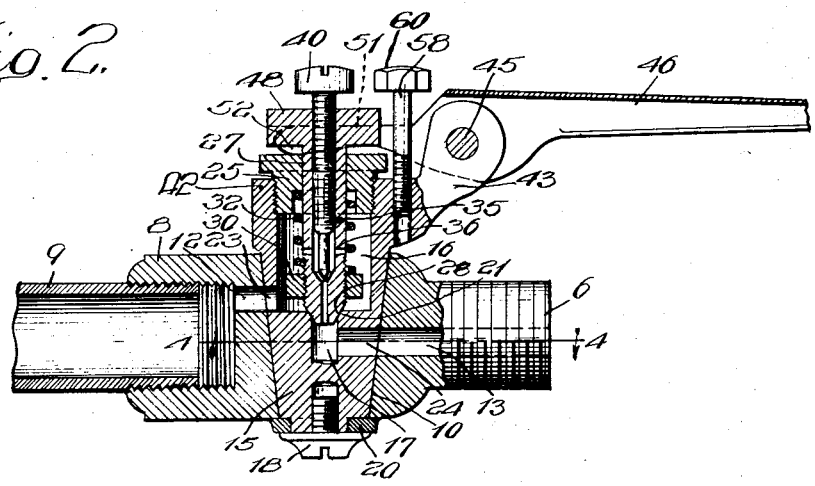
Fig. 2 is an enlarged longitudinal section through the valve thereof.
Figure 3:
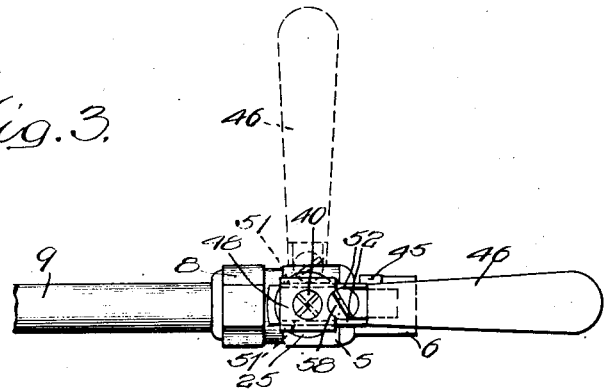
Fig. 3 is a top plan view of the valve and control means.

The device which I have shown comprises a valve casing or body 5 having a threaded nipple 6 which is threaded into the gas supply pipe of the stove. Opposite nipple 6, valve casing or body 5 has an internally threaded boss 8 into which is screwed or threaded one end of the igniter or outlet tube 9. The valve casing or body 5 has a tapered or conical bore 10 extending transversely therethrough and opening at different heights from this bore 10 into the tube 9 and nipple 6 respectively are ducts 12 and 13.

Rotatably mounted in the bore 10 is a tapered or conical plug 15 bored from its larger end to form an internal chamber 16. Opening from the inner or lower end of chamber 16 down into the plug 15 is a duct 17 the lower end of which terminates short of or above the lower end of the plug 15. A screw 18, having a suitable head at its lower end, is threaded up into the lower end of plug 15 and secures said plug 15 properly in the bore 10. A suitable washer 20 is preferably interposed between the head of the screw 18 and the annular joint between the bottom of the valve body 5 and the lower end of the plug 15, to seal said joint and prevent leakage.

At the upper end of duct 17 is a valve seat 21 and leading laterally from the bottom of chamber 16 above seat 21 and from duct 17 below seat 21 are ports 23 and 24 which are adapted to register with ducts 12 and 13, respectively.

Threaded into and closing the upper open end of chamber 16 is a nut 25 and slidably mounted in the nut 25 is a plunger or flash valve 27 having its lower end tapered at 28 for co-operation with the valve seat 21. Threaded upon the plunger stem 27 is a collar 30 and interposed between said collar 30 and the nut 25 is a coiled spring 32, the expansion of which normally seats the tapered end 28 of the plunger 27 downwardly or inwardly upon the seat 21 and closes off the duct 17 and chamber 16 from direct communication.

A restricted flow of gas from the outlet pipe to the tube 9 is permitted when the tapered end of plunger 27 is seated upon seat 21 through ducts 35 and 36 in plunger 27. These ducts constitute a by-pass about the valve seat 21 and the restricted gas supply permitted therethrough maintains the pilot flame or flames at the lighting or firing head 38 as well understood. The restricted fuel supply by way of ducts 35 and 36 is controlled or regulated by a stem or pin, conveniently in the form of a screw 40, threaded into plunger 27 and having its lower reduced end tapered for co-operation with a tapered seat in plunger 27 at the upper end of duct 35, so that by threading the screw 40 in or out the restricted fuel supply may be decreased or increased as desired.

Above the valve casing 5 the enlarged upper end or head 42 of the plug 15 has a lateral ear or lug 43 and pivoted at 45 upon this ear or lug 43 is an operating and control handle 46. The upper end of plunger stem 27 has an enlarged head 48, the under surface of which has two diametrically opposite parallel grooves 51 and the handle 46 has a forked end 52, the prongs or legs of the fork 52 entering the grooves 51 and holding the plunger 27 against rotation. At the same time the engagement of the fork with the upper part of the head 48, which it underlies, lifts the tapered end 28 of the plunger 27 from engagement with seat 21 when the opposite end of handle 46 is depressed. This places the duct 35 in direct communication with chamber 16 with a resulting increased flow of gas to the firing head 38. This increased gas or fuel supply produces the flash or lighting flame or flames, as the case may be.

A stop screw 58 threaded into the upper enlarged end of plug 15 extends up between the legs of the fork 52 and has a head 60 which at least partially overlies the head 48. The head of the screw 58, lying in the path of upward movement of the head at the upper end of plunger 27, forms a stop for limiting the depression of handle 46, and thereby the movement of tapered plunger end 28 from seat 21. By adjusting the screw 58 the valve opening for the flash or lighting flame may be adjusted to produce the desired regular, smooth, clean flame, with different gases and different gas pressures. For example, where the pressure of the gas is exceedingly high, the screw 58 may be adjusted to permit only an incomplete movement of plunger 27, just sufficient to produce a smooth clean flame. Where the gas pressure is lower the screw may be adjusted to permit a greater opening.

Figure 4:
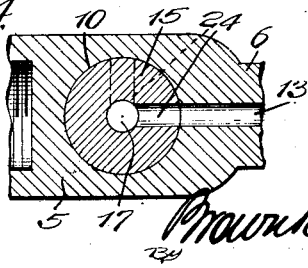
Fig. 4 is a horizontal section on line 4—4 of Figure 2.

At the same time the manner of mounting the handle 46 with the rotatable mounting of the plug 15 adapts the handle 46 for turning the plug on its own axis in the bore 10 to adjust the registration of ports 23 and 24 with ducts 12 and 13 or to move the ports 23 and 24 completely out of register with said ducts as into position at substantially right angles to the ducts as shown in dotted lines in Figure 4. Thus the handle serves as a master control for shutting off or adjusting the gas flow from the source to tube 9 and also as the flash producing handle.

This makes a simple and convenient provision for shutting off the pilot and flash flames of the igniter, whether the stove is fitted with a shut-off cock or valve in the fuel line, or not. This shut-off feature is particularly desirable during the summer months when a great many people are away on vacations and their stoves are not in use. At the same time the registration of ports 23 and 24 with ducts 12 and 13 may be adjusted to increase or decrease the effective fuel supply area to tube 9 according to the gas or pressure thereof. The gas pressure varies especially when natural gas is concerned. By adjusting the registration of ports 23 and 24 with ducts 12 and 13, a flame of the proper size, which will not go out or carbonize the hood of the lighting head 38, may be provided for any gas or gas pressure.

The pilot flame could be adjusted with very little turning of the plug 15 and I prefer to adjust the lighting flame or flash by means of the screw 58 to avoid appreciable turning of the handle 46 which is not desirable because it may position the same in an awkward position for producing the flash, and may in operation be jarred from its correct adjusted position. When turned to complete shut-off position, however, the handle need not be conveniently accessible for producing the flash because a flash would never be produced with the device shut off and there are no flash operations likely to jar it from said position.

The provision of a structural combination that may be operated by a common or single handle to produce the flash and to shut-off the device and the manner of arrangement of a common handle for this purpose are important aspects of my invention. Another important aspect is the manner of combining the plunger flash valve with the rotatable shut-off valve and the common means for lifting the plunger and turning the shut-off valve.

While I have shown and described my present invention in connection with a lighter of the stationary type, that is, of the type which remains in a relatively fixed position, it is to be understood that the invention may be embodied in lighters of the swing type, or wherever else found adaptable. Furthermore, I do not intend to be limited to the precise details which I have shown and described.

I claim:

1. In combination, a valve casing, a rotatable valve in said casing, a plunger valve in said first valve, a seat for said plunger valve, said plunger valve having means permitting a restricted flow there past when said plunger valve is seated, and a common handle for unseating said plunger valve to increase the flow there past and for turning said first valve to shut off the restricted and increased flow.

2. In a lighter of the class described, the combination of a valve casing for connection with a source of fuel, a valve plug rotatably mounted in said casing, an outlet tube carried by and communicating with the interior of said casing, a plunger valve mounted in said plug, a seat for said valve, said plunger valve having means permitting a restricted supply of fuel when the valve is seated and a common handle for unseating said valve to increase the fuel supply and for turning the valve plug to shut off the restricted and increased fuel supplies.

3. In a device of the class described, the combination of a valve casing having a tapered bore provided with inlet and outlet ducts, a valve plug rotatably mounted in said bore, said plug having port means for registration with said ducts, a plunger valve mounted in said plug and provided with means permitting a restricted supply of fuel to the outlet, a valve seat for said plunger valve and a handle pivoted on the valve plug and operable to turn said plug to move the port means thereof out of register with said inlet and outlet ducts to shut off the fuel supply and to move the plunger valve from its seat to increase the fuel supply to the outlet.

4. In a device of the class described, the combination of a valve casing having a tapered bore, a valve plug rotatably mounted in said bore, port and duct means in the casing and plug for permitting a flow of gas therethrough, a valve seat in said plug, a plunger flash valve mounted in the plug and co-operable with said seat to restrict the flow of gas through the plug, said plunger valve having means permitting a restricted pilot supply of gas through the plug when seated, said plunger valve having a head at its upper end, and a handle pivoted on the plug adjacent said head, said handle having a fork underlying the plunger head for lifting the plunger valve from its seat and being adapted for turning the plug in its tapered bore to unregister the co-operating port and duct means in the plug and valve casing and shut off the gas supply through the plug.

5. In a lighter of the class described, the combination of a valve casing for connection with a source of fuel, a valve plug rotatably mounted in said casing, an outlet tube carried by and communicating with the interior of said casing, a plunger valve mounted in said plug, a seat for said valve, said plunger valve having means permitting a restricted supply of fuel when the valve is seated and a common handle for unseating said valve to increase the fuel supply and for turning the valve plug to shut off the restricted and increased fuel supplies, said handle having a projecting end holding said plunger valve against turning.

6. In a device of the class described, the combination of a valve casing having means for connection with a source of fuel supply, an outlet tube carried by and communicating with the interior of the casing, a rotatable shut-off valve mounted in the casing and provided with inlet and outlet port means for movement into and out of register with inlet and outlet ducts in the casing by rotation of the valve, a valve seat in the shut-off plug between the inlet and outlet ports, a plunger flash valve mounted in said plug and seating inwardly upon said seat, said plunger valve having means affording a restricted supply of fuel from the inlet to the outlet and means for unseating said valve outwardly to provide an increased flash supply.

In witness whereof, I hereunto subscribe my name this 18 day of November, 1924.

OSCAR J. LEINS.